United States Patent

Mukai et al.

[11] Patent Number: 5,927,430
[45] Date of Patent: Jul. 27, 1999

[54] ELECTRIC POWER STEERING APPARATUS

[75] Inventors: Yoshinobu Mukai; Yoshiki Noro; Osamu Tsurumiya; Takao Kurosawa; Nobuo Sugitani; Yasuo Shimizu, all of Wako, Japan

[73] Assignee: Honda Giken Kogyo Kabushiki Kaisha, Tokyo, Japan

[21] Appl. No.: 09/124,601

[22] Filed: Jul. 29, 1998

[30] Foreign Application Priority Data

Aug. 1, 1997 [JP] Japan ................................. 9-208140

[51] Int. Cl.⁶ ..................................................... B62D 5/04
[52] U.S. Cl. ............................................. 180/446; 701/41
[58] Field of Search ...................... 180/446, 443; 701/41

[56] References Cited

U.S. PATENT DOCUMENTS 4,869,334  9/1989  Marumoto et al. ..................... 180/446
5,809,438  9/1998  Noro et al. ................................ 701/41

Primary Examiner—Daniel G. DePumpo
Assistant Examiner—Lynda Jasmin
Attorney, Agent, or Firm—Merchant, Gould, Smith, Edell, Welter & Schmidt, P.A.

[57] ABSTRACT

An electric power steering apparatus includes a control unit having a sensor fault detecting section, a first drive control signal generating section, a second drive control signal generating section, and a motor drive control mode switching section. When the sensor fault detecting section does not detect any faulty sensor, operation of an electric motor is feedback-controlled in such a manner that an offset between a target current set in accordance with a steering torque and a motor current becomes zero, and the motor applies a steering assist torque to the steering system on the basis of a first drive control signal supplied from the first drive control signal generating section. When a faulty sensor is detected by the sensor fault detecting section, the motor drive control switching section changes over drive control modes of the motor such that the motor is feedforward-controlled on the basis of a second drive control signal which is generated by the second drive control signal generating section on the basis of a target current signal set in accordance with a steering torque.

1 Claim, 4 Drawing Sheets

ELECTRIC POWER STEERING APPARATUS

BACKGROUND OF THE INVENTION

1. Field of the Invention

The present invention relates generally to an electric power steering apparatus which provides power assist of an electric motor directly to a steering system so as to reduce necessary steering power to be applied by the driver. More particularly, it relates to such an electric power steering apparatus which is capable of providing the power assist even when operation of a sensor such as a motor current detector becomes abnormal.

2. Description of the Related Art

FIG. 4 of the accompanying drawings shows in block diagram the general construction of a control unit 120 of a conventional electric power steering apparatus.

The conventional control unit 120 generally includes a target current calculating section 121, a target current correcting section 122, a feedback (F/B) control section 123, a motor driving section 124, a motor speed calculating section 125, a sensor fault detecting section 126, and a fault indicating section or indicator 127.

The target current calculating section 121 determines a target assist torque on the basis of a steering torque signal Tp supplied from a steering torque sensor 112 and outputs a signal (hereinafter referred to as "target current") IT corresponding to a target current value required for an electric motor 110 to apply the target assist torque to a steering system. The target current IT is supplied to the target current correcting section 122.

The target current correcting section 122 calculates and outputs a signal (hereinafter referred to as "corrected target current") ITH corresponding to a corrected target current value resulting from a correction made to the target current IT on the basis of a steering angle signal 114a supplied from a steering angle sensor 114, a vehicle velocity signal 116a supplied from a vehicle velocity sensor 116, yaw rate signal 118a supplied from a yaw rate sensor 118, and a motor speed signal 125a determined by calculation at a motor speed calculating section 125 to meet the current vehicle running conditions such as the steering condition, vehicle velocity, and yaw rate, and the rotational speed of an electric motor 110. The corrected target current ITH is supplied to the feedback control section 123.

The feedback control section 123 includes an offset calculating part 131 and a PID (proportional and integral and derivative) control part or controller 132. The offset calculating part 131 determines an offset between the corrected target current ITH and a signal (hereinafter referred as "motor current") IM corresponding to a motor current detected by a motor current detecting unit or detector 128, and outputs an offset signal 131a representing the determined offset (ITH-IM). The offset signal 131a is supplied to the PID controller 132. The PID controller 132 applies PID arithmetic processing to the offset signal 131a to generate a drive control signal 132a which controls a current to be supplied to the electric motor 110 so as to render the offset (ITH-IM) zero. The drive control signal 132a is supplied to the motor drive section 124.

The motor drive section 124 includes a PWM (pulse-width modulation) signal generating part or generator 141, a gate drive circuit 142, and a motor drive circuit 143 consisting of four power FETs (field-effect transistors) connected in an H-type bridge. The PWM signal generator 141 generates, on the basis of the drive control signal 132a, a PWM signal 141a for PWM-driving the electric motor 110. The PWM signal 141a is supplied to the gate drive circuit 142. The gate drive circuit 142 drives the gates of the FETs and thereby drives switching of the FETs on the basis of the PWM signal 141a. Thus, the control unit 120 PWM-controls power supplied from a battery power source BAT to the electric motor 110 on the basis of the steering torque Tp detected by the steering torque sensor 112 and thereby control the output power (steering assist force or torque) of the electric motor 110.

The motor speed calculating section 125 calculates a rotational speed of the electric motor 110 on the basis of the motor current IM detected by the motor current detector 128 and a signal (hereinafter referred to as "motor voltage") VM corresponding to a motor voltage detected by a motor voltage detecting unit or detector 129, and outputs a motor speed signal 125a corresponding to the calculated rotational speed of the electric motor 110.

The sensor fault detecting section 126 monitors the steering angle signal 114a, the vehicle velocity signal 116a, the yaw rate signal 118a, the motor speed signal 125a, the motor current IM and the motor voltage VM. When any one of the signals 114a, 116a, 118a, 125a, IM and VM is outside a predetermined range of signal value set in advance for each signal, when any one of the signals 114a, 116a, 118a, 125a, IM and VM is not supplied from the corresponding sensor or detector, or when any one of the signals 114a, 116a, 118a, 125a, IM and VM varies abnormally, the sensor fault detecting section 126 judges the sensor (detector) 114, 116, 118, 125, 128 or 129 to be operating abnormally and outputs a sensor fault detection signal 126a. The sensor fault detecting section 126 is constructed to store detection of a sensor fault in a nonvolatile memory so that the sensor fault detection signal 126a is automatically output when the power is turned on at the next operation the control unit 120. The sensor fault detection signal 126a is supplied to the motor drive section 124 and the fault indicator 127.

Upon receipt of the sensor fault detection signal 126a, the motor drive section 124 stops the PWM signal generating operation or the gate driving operation, or opens contacts of a relay (not shown) disposed between the battery power source BAT and the motor drive circuit 143, thereby stopping operation of the electric motor 110.

The fault indicator 127 is an indicator that upon receipt of the sensor fault detection signal 126a, provides an instantaneous alarm, both visual and audible, of a failure detected in the sensor to thereby indicate that a failure arises in the sensors and the electric power steering apparatus is in the inoperative condition due to the failure in the sensor.

However, in the conventional electric power steering apparatus having the control unit 120 shown in FIG. 4, when the motor current detector 128 provided for the feedback control of operation of the electric motor 110 or another sensor provided to generate a signal for the correction of a steering assist torque in accordance with running conditions of the vehicle becomes anomalous in operation, or when a sensor's operation failure is detected in error, because supply of the steering assist force from the electric motor 110 is suddenly stopped, the steering wheel becomes suddenly heavy, and this may be disconcerting for the driver.

To avoid these difficulties caused by sudden stop of the supply of steering assist force, it may be considered that two sets of sensors are provided so that when one set of sensors becomes faulty, operation of the control unit can be continued based on information from the other set of sensors. Such fail-safe system, however, will increase the number of components needed and the cost of the vehicle.

SUMMARY OF THE INVENTION

It is accordingly an object of the present invention to provide an electric power steering apparatus which can continue operation of an electric motor to supply a steering assist force or torque even when a motor current detector provided for feedback control of the electric motor or another sensor provided for supplying information to correct the assist steering torque is operating abnormally.

According to the present invention, there is provided an electric power steering apparatus for a vehicle, comprising: an electric motor for applying a steering assist torque to a steering system operatively connecting a steering wheel and steerable wheels of the vehicle; a steering torque sensor for detecting a steering torque of the steering system and outputting a steering torque signal corresponding to the detected steering torque; a target current calculating section for calculating, on the basis of at least the steering torque signal, a target current to be supplied to the electric motor and outputting a target current signal corresponding to the calculated target current; a motor current detector for detecting a current flowing in the electric motor and outputting a motor current signal corresponding to the detected current; an offset calculating section for calculating an offset between the target current signal and the motor current signal and outputting an offset signal corresponding to the calculated offset; a first drive control signal generating section for generating, on the basis of the offset signal, a first drive control signal to drive the electric motor; a second drive control signal generating section for generating, on the basis of the target current signal, a second drive control signal to drive the electric motor; a fault defecting section for detecting abnormality in the electric power steering apparatus; and a motor drive control mode switching section for changing over drive control modes of the electric motor such that when abnormality in the apparatus is not detected by the fault detecting section, operation of the electric motor is controlled on the basis of the first drive control signal, and when abnormality in the apparatus is detected by the fault detecting section, operation of the electric motor is controlled on the basis of the second drive control signal.

The fault detecting section detects a failure in said motor current detector.

In the electric power steering apparatus, when abnormality in the apparatus, such as a failure of the motor current detector, is not detected, the electric motor is feedback-controlled on the basis of the first drive control signal in such a manner that an offset between the target current signal set in accordance with the steering torque and the motor current signal is rendered zero. Thus, a steering assist torque corresponding to the steering torque is supplied from the electric motor to the steering system.

When abnormality of the apparatus, such as a failure of the motor current detector, is detected, the electric motor is feedforward-controlled on the basis of the second drive control signal generated on the basis of the target current signal set in accordance with the steering torque. Thus, a steering assist torque corresponding to the steering torque is supplied from the electric motor to the steering system.

The electric power steering system according to the present invention can continue supply of a steering assist torque from the electric motor to the steering system even when operation failures in various sensors are detected. The apparatus is, therefore, free from the problem that when supply of the steering assist torque is suddenly stopped, the steering wheel becomes heavy, thereby disconcerting the driver and deteriorating the steerability of the vehicle.

The above and other objects, features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Figure 1:
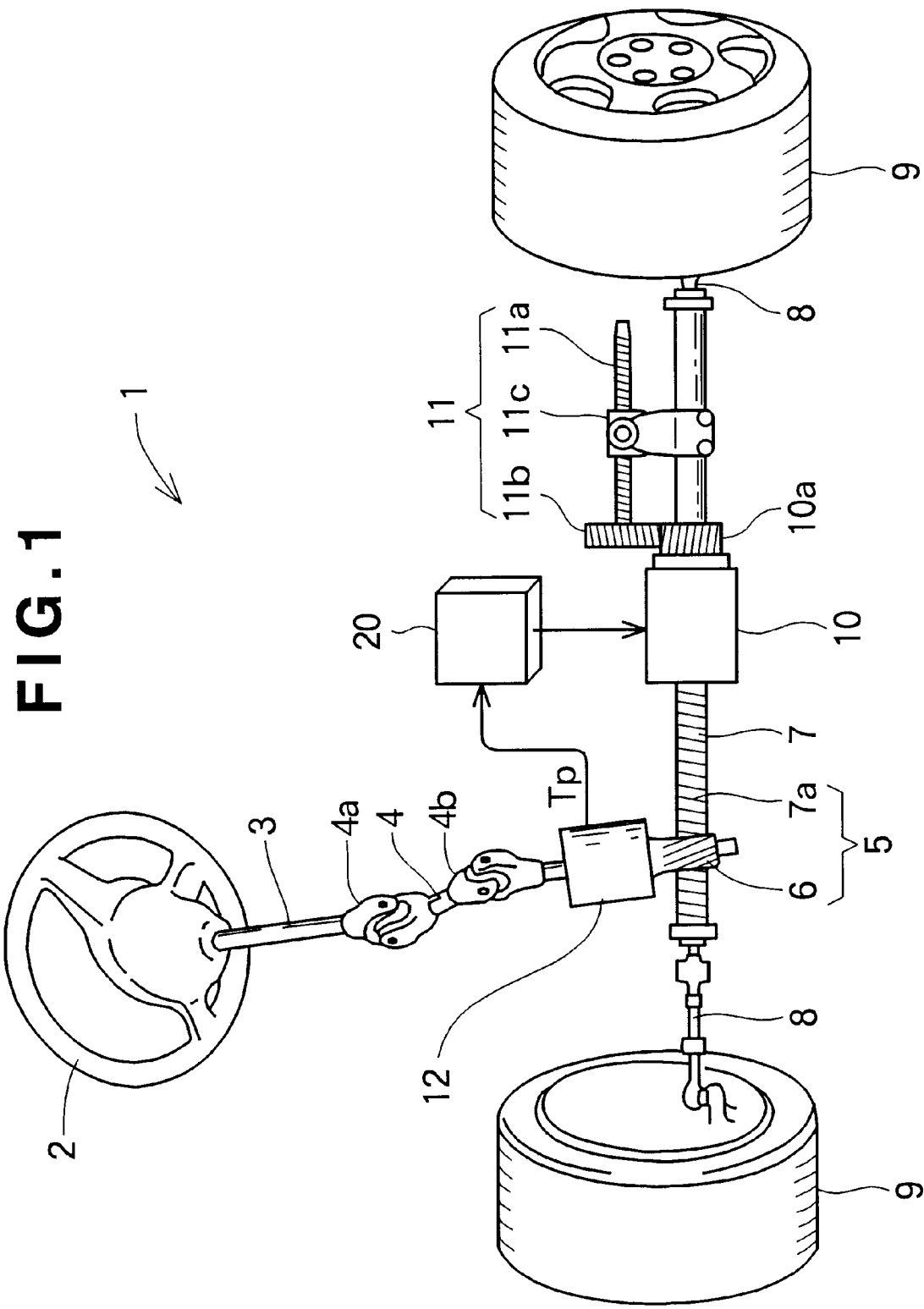
FIG. 1 is a diagrammatical view showing the general construction of an electric power steering apparatus.

Certain preferred embodiments of the present invention will be described below in greater detail with reference to the accompanying drawings, wherein like reference characters designate like or corresponding parts throughout several views.

Referring to FIG. 1, there is shown the general construction of an electric power steering apparatus 1 according to the present invention. The electric power steering apparatus 1 includes a steering system equipped with an electric motor 10 and operatively connecting a steering wheel 2 and steerable from wheels 9, 9 of a vehicle, and a control unit 20 for controlling the output power of the electric motor 10 so as to reduce manual steering effort or force to be applied by the driver to turn the steering wheel 2.

The steering system includes a steering column or shaft 3 connected at one end to the steering wheel 2. The opposite end of the steering shaft 3 is connected by a connecting shaft 4 having universal joints 4a, 4b to a pinion 6 of a rack-and-pinion mechanism 5. The pinion 6 meshes with a rack of gear teeth 7a on a rack shaft 7. The rack-and-pinion mechanism 5 converts rotation of the pinion 6 into axial reciprocating motion of the rack shaft 7. The steerable right and left front wheels 9 are connected to the opposite ends of the rack shaft 7 via tie rods 8. When the steering wheel 2 is turned, the front wheels 9 are caused to pivot by way of the rack-and-pinion mechanism 5 and the tie rods 8. In this way it is possible to change the direction of the vehicle.

In order to reduce the manual steering effort or force that must be exerted by the driver, the electric motor 10 for supplying a steering assist torque is disposed concentrically with the rack 7 and a rotational output of the electric motor 10 is converted into a thrust force and made to act on the rack shaft 7 via a ball screw mechanism 11 mounted substantially parallel with the rack 7. The electric motor 10 has a rotor equipped with a drive helical gear 10a which is in mesh with a driven helical gear 11b attached to an end of a screw shaft 11a of the ball screw mechanism 11. A nut 11c of the ball screw mechanism 11 is connected to the rack 7.

A steering torque detecting device (steering torque sensor) 12 is disposed in a steering box (not shown) for detecting a manual steering torque Ts acting on the pinion 6. The steering torque sensor 12 supplies a steering torque signal Tp corresponding to the detected steering torque Ts, to the control unit 20. The control unit 20 operates the electric motor 10 on the basis of the steering torque signal Tp taken as a main signal and thereby controls the output power (steering assist torque) of the electric motor 10.

Figure 2:
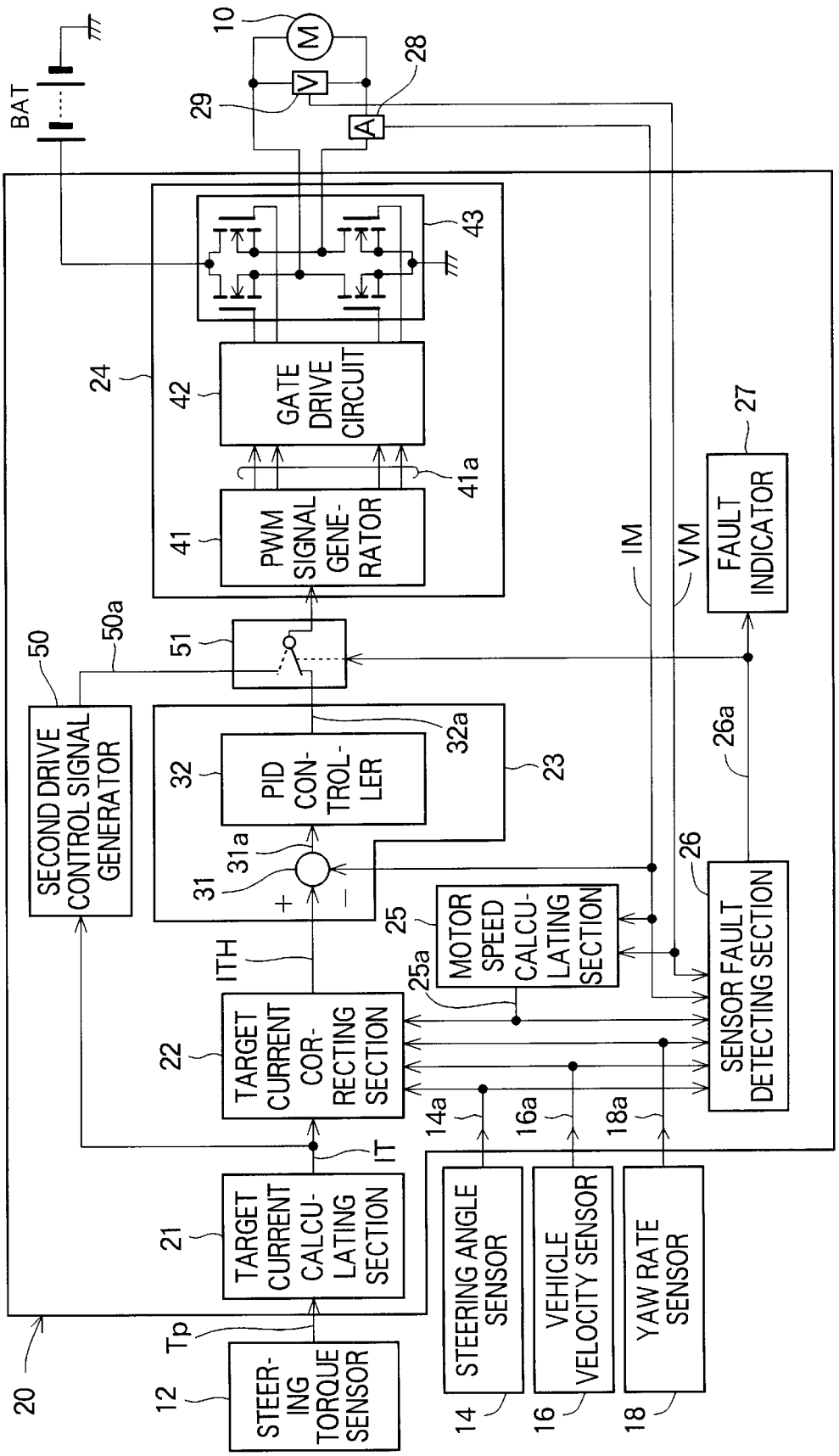
FIG. 2 is a block diagram showing a control unit of the electric power steering apparatus according to a first embodiment of the present invention.

FIG. 2 shows in block diagram the arrangement of a first embodiment of the control unit 20 according to the present invention.

Figure 4:
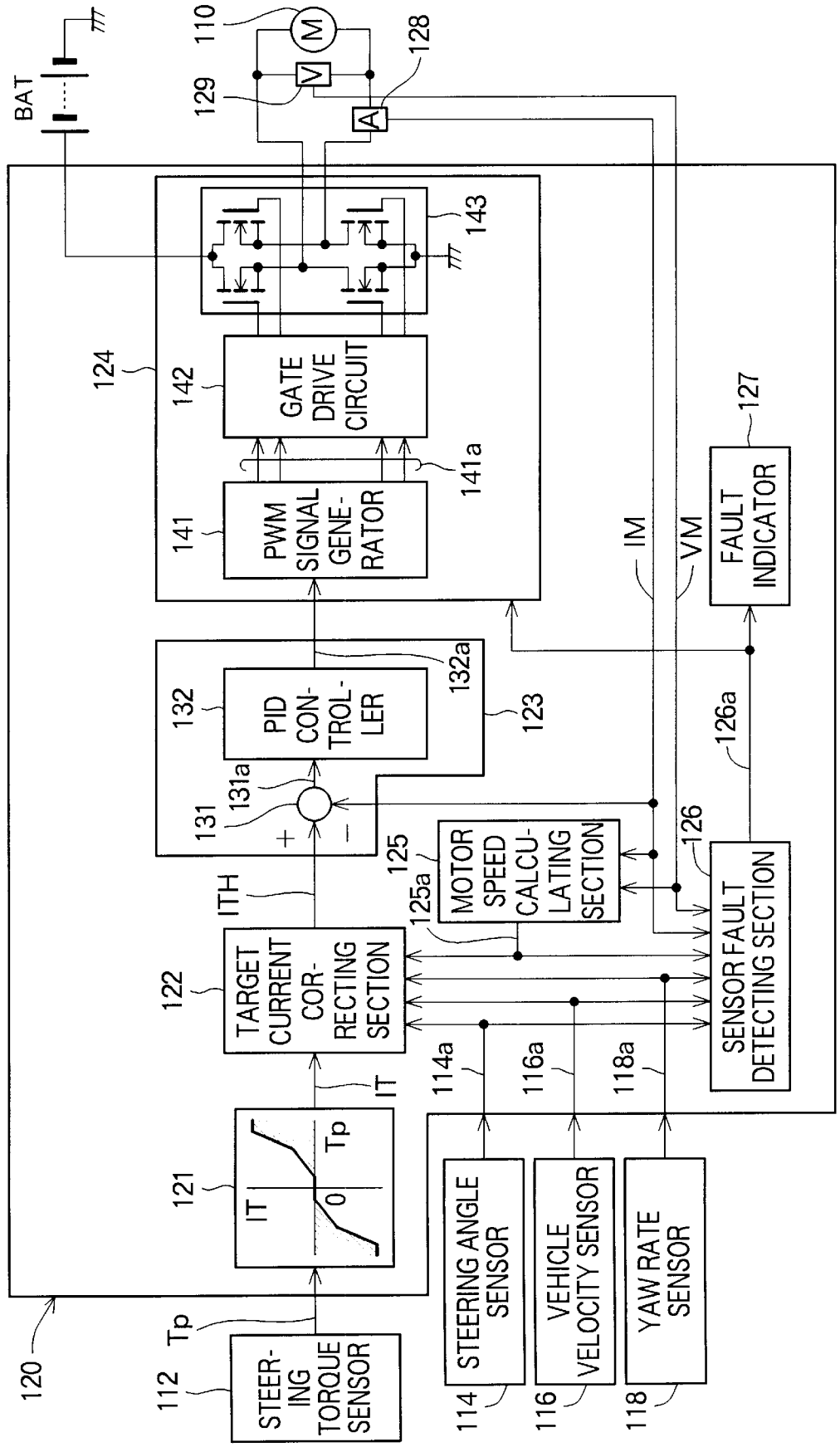
FIG. 4 is a block diagram showing a control unit of a conventional electric power steering apparatus.

As shown in FIG. 2, the control unit 20 includes a target current calculating section 21, a target current correcting section 22, a feedback (F/B) control section 23 forming a first drive signal generating section or generator, a second drive signal generating section or generator 50, a motor drive control mode switching section 51, a motor drive section 24, a motor current calculating section 25, a sensor fault detecting section 26 forming a fault detecting section, and a fault indicating section or indicator 27. The control unit 20 differs from the conventional control unit 120 shown in FIG. 4 in that the second drive control signal generator 50 and the motor drive control mode switching section 51 are added.

The target current calculating section 21 determines a target assist torque on the basis of a steering torque signal Tp supplied from the steering torque sensor 12 and outputs a signal (hereinafter referred to as "target current") IT corresponding to a target current value required for the electric motor 10 to supply the target assist torque to the steering system. The target current IT is supplied to the target current correcting section 22.

The target current correcting section 22 calculates and outputs a signal (hereinafter referred to as "corrected target current") ITH corresponding to a corrected target current value resulting from the target current IT corrected the basis of a steering angle signal 14a supplied from a steering angle sensor 14, a vehicle velocity signal 16a supplied from a vehicle velocity sensor 16, a yaw rate signal 18a supplied from a (vehicle body) yaw rate sensor 18, and a motor speed signal 25a determined by calculation at the motor speed calculating section 25 so as to meet the current vehicle running conditions including the steering condition, vehicle velocity and raw rate, and the rotational speed of the electric motor 10. The corrected target current ITH is supplied to the feedback control section 23.

The feedback control section 23 includes an offset calculating part 31 and a PID (proportional and integral and derivative) control part or controller 32. The offset calculating part 31 determines an offset between the corrected target current ITH and a signal (hereinafter referred as "motor current") IM corresponding to a motor current detected by a motor current detecting unit or detector 28, and outputs an offset signal 31a representing the determined offset (ITH-IM). The offset signal 31a is supplied to the PID controller 32. The PID controller 32 applies PID arithmetic processing to the offset signal 31a to generate a drive control signal 32a which controls a current to be supplied to the electric motor 10 in order to make the offset (ITH-IM) approach zero. The drive control signal 32a is supplied to the motor drive section 24 through the motor drive control mode switching section 51.

The motor drive section 24 includes a PWM (pulse-width modulation) signal generating part or generator 41, a gate drive circuit 42, and a motor drive circuit 43 consisting of four power FETs (field-effect transistors) connected in an H-type bridge. The PWM signal generator 41 generates, on the basis of the drive control signal 32a, a PWM signal 41a for PWM-driving the electric motor 10. The PWM signal 41a is supplied to the gate drive circuit 42. The gate drive circuit 42 drives the gates of the FETs and thereby drives switching of the FETs on the basis of the PWM signal 41a. Thus, the control unit 20 PWM-controls power supplied from a battery power source BAT to the electric motor 10 on the basis of the steering torque Tp detected by the steering torque sensor 12 and thereby control the output power (steering assist torque) of the electric motor 10.

The motor speed calculating section 25 calculates a rotational speed of the electric motor 10 on the basis of the motor current IM detected by the motor current detector 28 and a signal (hereinafter referred to as "motor voltage") VM corresponding to a motor voltage detected by a motor voltage detecting unit or detector 29, and outputs a motor speed signal 25a corresponding to the calculated rotational speed of the electric motor 10.

The sensor fault detecting section 26 monitors the steering angle signal 14a, the vehicle velocity signal 16a, the yaw rate signal 18a, the motor speed signal 25a, the motor current IM and the motor voltage VM. When any one of the signals 14a, 16a, 18a, 25a, IM and VM is outside a predetermined range of signal value set in advance for each signal, when any one of the signals 14a, 16a, 18a, 25a, IM and VM is not supplied from the corresponding sensor or detector, or when any one of the signals 14a, 16a, 18a, 25a, IM and VM varies abnormally, the sensor fault detecting section 26 judges the sensor (detector) 14, 16, 18, 25, 28 or 29 to be operating abnormally or at fault and outputs a sensor fault detection signal 26a. The sensor fault detecting section 26 is constructed to store detection of a sensor fault in a nonvolatile memory so that the sensor fault detection signal 26a is automatically output when the power is turned on at the next operation of the control unit 20. The sensor fault detection signal 26a is supplied to the motor drive section 24 and the fault indicator 27.

The fault indicator 27 is an indicator that upon receipt of the sensor fault detection signal 26a, provides an instantaneous alarm, both visual and audible, of a failure detected in the sensor to thereby indicate that a failure arises in the sensors and the electric power steering apparatus is in the inoperative condition due to the failure in the sensor.

The second drive control signal generator 50 generates a second drive control signal 50a on the basis of the target current signal IT output from the target current calculating section 21, and outputs the second drive control signal 50a to the motor drive section 24 through the motor drive control mode switching section 51.

The motor drive control mode switching section 51, when it is supplied with the sensor fault detection signal 26a from the sensor fault detecting section 26, supplies the first drive control signal 32a from the PID controller 32 to the PWM signal generator 41. Alternately, when it is supplied with the sensor fault detection signal 26a, the motor drive control mode switching section 51 operates to changeover the first drive control signal 32a to the second drive control signal 50a and supplies the second drive control signal 50a to the PWM signal generator 41.

Accordingly, when the motor current detector 28, the motor voltage detector 29, the steering angle sensor 14, the vehicle velocity sensor 16, and the yaw rate sensor 18 are operating normally, the motor current IM supplied to the electric motor 10 on the basis of the correct target current ITH is feedback-controlled. When any one of the sensors (detectors) 28, 29, 14, 16, 18 becomes anomalous in operation, operation of the electric motor 10 is feedforward-controlled on the basis of the second drive control signal 50a generated based on the target current IT.

The second drive control signal generator 50 outputs a 50 to 80 percent value, for example, of the target current IT as the second drive control signal 50*a*. Because a smaller value than the target current IT is output as the second second drive control signal 50*a*, the steering assist torque supplied from the electric motor 10 is reduced to thereby allow the driver to notify an abnormal condition in which the steering assist torque is not correctly supplied (or the control unit 20 is operating abnormally). Under the feedforward control of the electric motor 10 performed based on the second drive control signal 50*a*, the current supplied to the electric motor 10 may increase extraordinarily with a sudden increase in the steering torque Tp, for example. To cope with this problem, a gain of the second drive control signal generator 50 is set to be small enough to prevent the steering assist torque supplied from the electric motor 10 from varying extraordinarily with changes in the steering torque Tp.

As described above, because when an operation failure in any of the sensors 28, 29, 14, 16, 18 is detected by the sensor fault detecting section 26, operation of the electric motor 10 is controlled on the basis of the second drive control signal 50*a* generated by the second drive control signal generator 50, the control unit 20 can operate the electric motor 10 to supply a steering assist torque the steering system on the basis of the steering torque even though the sensor is operating abnormally. Thus, the driver is not disconcerted by a sudden stop of the supply of the steering assist force. By virtue of the steering assist torque continuously supplied in correspondence with the steering torque Tp without regard to the failure detected in the sensor, the steering wheel can be turned lightly and smoothly even when the vehicle is steering for parking.

Figure 3:
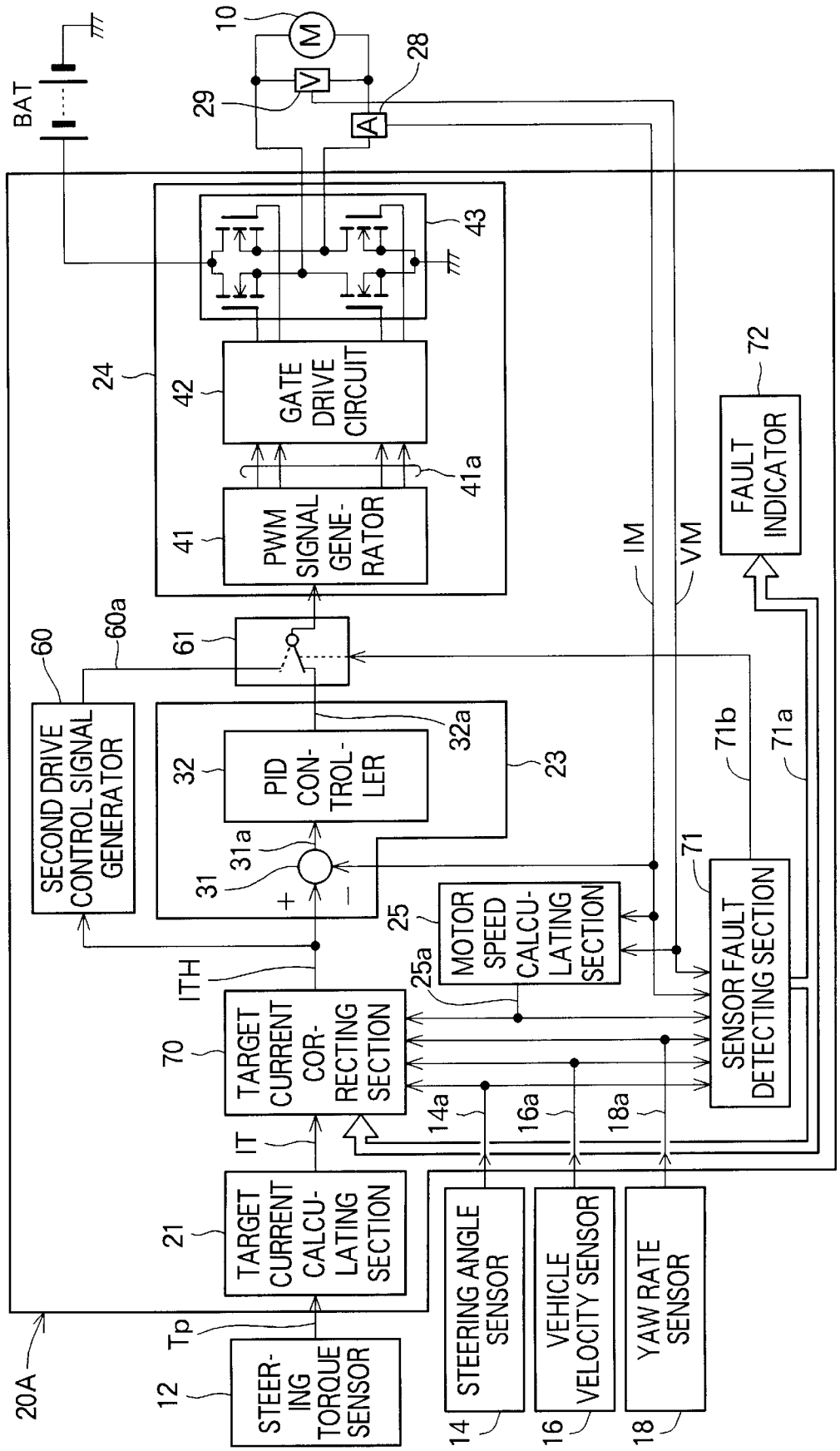
FIG. 3 is a block diagram showing a control unit of the electric power steering apparatus according to a second embodiment of the present invention.

Reference is made to FIG. 3 which shows in block diagram the construction of a control unit 20A according to a second embodiment of the present invention.

As shown in FIG. 3, the control unit 20A comprises a target current calculating section 21, a target current correcting section 70, a feedback (F/B) control section 23 constituting a first drive signal generating section or generator, a second drive signal generating section or generator 60, a motor drive control mode switching section 61, a motor drive section 24, a motor current calculating section 25, a sensor fault detecting section 71 constituting a fault detecting section, and a fault indicating section or indicator 72.

The sensor fault detecting section 71 monitors a steering angle signal 14*a* supplied from a steering torque sensor 12, a vehicle velocity signal 16*a* supplied from a vehicle velocity sensor 16, a yaw rate signal 18*a* supplied from a yaw rate sensor 18, a motor speed signal 25*a* supplied from the motor speed calculating section 25, a motor current IM detected by a motor current detector 28, and a motor voltage VM detected by a motor voltage sensor 29. When any one of the signals 14*a*, 16*a*, 18*a*, 25*a*, IM and VM is outside a predetermined range of signal value set in advance for each signal, when any one of the signals 14*a*, 16*a*, 18*a*, 25*a*, IM and VM is not supplied from the corresponding sensor or detector, or when any one of the signals 14*a*, 16*a*, 18*a*, 25*a*, IM and VM varies abnormally, the sensor fault detecting section 71 judges the sensor (detector) 14, 16, 18, 25, 28 or 29 to be operating abnormally or at fault and outputs faulty sensor identification information 71*a*. The faulty sensor identification information 71*a* is supplied to the fault indicator 72 and the target current correcting section 70.

The sensor fault detecting section 71, when it detects anomaly in operation of the motor current detector 28, outputs a drive control mode changeover signal 71*b*. The drive control mode changeover signal 71*b* is supplied to the motor drive control mode switching section 61.

The fault indicator 72 is an indicator that upon receipt of the faulty sensor identification information 71*a*, provides an instantaneous alarm, both visual and audible, to identify which sensor is operating abnormally. For instance, when an operation failure in the vehicle velocity sensor 16 is detected by the sensor fault detecting section 71, the fault indicators 72 indicates the vehicle velocity sensor 16 operating abnormally. Similarly, when an operation failure of the motor current detector 28 is detected by the sensor fault detecting section 71, the fault indicator 72 indicates the vehicle velocity sensor 16 operating abnormally.

The target current correcting section 70, when it is not supplied with the faulty sensor identification information 71*a*, calculates and outputs a corrected target current ITH resulting from a target current IT corrected on the basis of the steering angle signal 14*a*, the vehicle velocity signal 16*a*, the yaw rate signal 18*a*, and the motor speed signal 25*a*, so as to meet the current vehicle running conditions including the steering condition, vehicle velocity and yaw rate, and the rotational speed of the electric motor 10.

The target current correcting section 70, when it finds the steering angle sensor 14 abnormal in operation on the basis of the faulty sensor identification information 71*a*, stops target current correcting operation based on the steering angle. Similarly, when the faulty sensor identification information 71*a* makes the target current correcting section 70 acknowledge the vehicle velocity sensor 16 operating abnormally, the target current correcting section 70 performs a correction to reduce the target current IT on the assumption that the vehicle is running at a maximum speed. Alternatively, when an operation failure in the yaw rate sensor 18 is acknowledged by the target current correcting section 70 on the basis of the faulty sensor identification information 71*a*, the target current correcting section 70 stops target current correcting operation based on the yaw rate of the vehicle body, or performs a correction to lower the target current IT on the assumption that the yaw rate is at a maximum. Similarly, the faulty sensor identification information 71*a* makes the target current correcting section 70 to acknowledge the motor current detector 28 or the motor voltage detector 29 to be in an abnormally operating condition, the target current correcting section 70 stops correction of the target current IT based on the motor speed 25*a* calculated by the motor speed calculating section 25.

Thus, instead of performing correction of the target current correcting section 70 based on the signal supplied from a faulty sensor (or further to a fail-safe operation performed on the correction the target current IT on the basis of the faulty sensor's signal), the target current correcting section 70 performs corrections of the signals supplied from the remaining sensors (normally operating sensors) and outputs the results of corrections as a corrected target current ITH. The corrected target current ITH is supplied to the feedback control section (first drive control signal generator) 23 and the second drive control signal generator 60.

The feedback control section (first drive control signal generator) 23 generates and outputs a first drive control signal 32*a* as a result of PID control applied to an offset between the corrected target current ITH which has been corrected on the basis of the signals from the normally operating sensors, and the motor current IM in such a manner that the offset approaches zero.

The second drive control signal generator 60 generates a second drive control signal 60*a* on the basis of the corrected target current ITH which has been corrected on the basis of the signals from the normally operating sensors. The second drive control signal generator 60 is so constructed as to output a 50 to 80 percent value of the corrected target current ITH.

The motor drive control mode switching section 61, when the drive control mode changeover signal 71b is not supplied to it, allows the first drive control signal 32a output from the feedback control section 23 to be supplied to the motor drive section 24. When the drive control mode changeover signal 71b is supplied to the motor drive control mode switching section 61, the motor drive control mode switching section 61 allows the second drive control signal 60a output from the second drive control signal generator 60 to be supplied to the motor drive section 24.

In the control unit 20A of the second embodiment shown in FIG. 3, when the sensors are operating normally, a target current IT is set by the target current calculating section 21 on the basis of a steering torque Tp detected by the steering torque sensor 12, then a corrected target current ITH is generated by the target current correcting section 70 as a result of correction made on the target current IT on the basis of running conditions of the vehicle and the rotational speed of the electric motor 10, and operation of the electric motor 10 is feedback-controlled by the feedback control section in such a manner that an offset between the corrected target current ITH and a motor current IM approaches zero.

When any of the sensors becomes anomalous in operation, operation of the electric motor 10 is controlled on the basis of the second drive control signal 60a. Because the second drive control signal generator 60 generates this second drive control signal 60a on the basis of the corrected target current ITH, when the steering angle sensor 14, the vehicle velocity sensor 16 and the yaw rate sensor 18 are operating normally, the electric motor 10 is controlled in operation by a corrected target current ITH obtained as a result of correction of the target current IM made on the basis of the signals supplied from these sensors 14, 16, 18.

In the case where an operation failure arises in one of the steering angle sensor 14, the vehicle velocity sensor 16 and the yaw rate sensor 18 while the motor current detector 28 is operating normally, correction of the target current on the basis of the faulty sensor's signal is stopped (or replaced with a fail-safe operation thereof) and, at the same time, feedback control based on the offset between a corrected target current ITH resulting from the target current corrected on the basis of the normally operating sensor's signals and the motor current IM.

Accordingly, even when a failure arises in the motor current detector 28, supply of the steering assist torque from the electric motor 10 to the steering system can still be continued. When any one of the steering angle sensor 14, the vehicle velocity sensor 16 and the yaw rate sensor 18 becomes abnormal in operation, operation of the electric motor 10 is feedback-controlled while the target current IT is being corrected on the basis of the outputs from the remaining sensors operating normally.

In the control unit 20 of the second embodiment shown in FIG. 3, the target current calculating section 21 and the target current correcting section 70 may be arranged to jointly form a target current calculating section that determines, by calculation on the basis of at least the steering torque signal Tp, a target current to be supplied to the electric motor 10 and outputs a target current signal corresponding to the determined target current.

Additionally, although in the control unit 20 of the first embodiment shown in FIG. 2 a target current IT calculated by the target current calculating section 21 is supplied to the second drive control signal generator 50 to generate a second drive control signal 50a, the target current correcting section 70 and the sensor fault detecting section 71 of the second embodiment shown in FIG. 3 may be incorporated in the control unit 20 so that the second drive control signal is generated on the basis of the corrected target current ITH.

Obviously, various minor changes and modifications are possible in the light of the above teaching. It is to be understood that within the scope of the appended claims the present invention may be practiced otherwise than as specifically described.

What is claimed is:

1. An electric power steering apparatus for a vehicle, comprising:

an electric motor for applying a steering assist torque to a steering system operatively connecting a steering wheel and steerable wheels of the vehicle;

a steering torque sensor for detecting a steering torque of said steering system and outputting a steering torque signal corresponding to the detected steering torque;

a target current calculating section for calculating, on the basis of at least said steering torque signal, a target current to be supplied to said electric motor and outputting a target current signal corresponding to the calculated target current;

a motor current detector for detecting a current flowing in said electric motor and outputting a motor current signal corresponding to the detected current;

an offset calculating section for calculating an offset between said target current signal and said motor current signal and outputting an offset signal corresponding to the calculated offset;

a first drive control signal generating section for generating, on the basis of said offset signal, a first drive control signal to drive said electric motor;

a fault detecting section for detecting abnormality in said electric power steering apparatus wherein said fault detecting section is capable of detecting a failure in said motor current detector;

a second drive control signal generating section for generating on the basis of said target current signal a second drive control signal to drive said electric motor wherein the second drive control signal generating section generates the second drive control signal independently of the motor current signal at least when the fault detecting section detects a failure in said motor current detector, and a motor drive control mode switching section for changing over drive control modes of said electric motor such that when abnormality in said apparatus is not detected by said fault detecting section, operation of said electric motor is controlled on the basis of said first drive control signal, and when abnormality in said apparatus is detected by said fault detecting section, operation of said electric motor is controlled on the basis of said second drive control signal.

* * * * *